(12) United States Patent
Walters

(10) Patent No.: US 10,589,833 B2
(45) Date of Patent: Mar. 17, 2020

(54) DRAIN GROMMET WITH INTEGRATED FIRE SHIELD

(71) Applicant: The Boeing Company, Chicago, IL (US)

(72) Inventor: John Charles Walters, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 15/914,447

(22) Filed: Mar. 7, 2018

(65) Prior Publication Data

US 2019/0276130 A1 Sep. 12, 2019

(51) Int. Cl.
*B64C 1/14* (2006.01)
*A62C 3/08* (2006.01)
*A62C 2/06* (2006.01)
*B64C 3/00* (2006.01)

(52) U.S. Cl.
CPC .............. *B64C 1/1453* (2013.01); *A62C 2/06* (2013.01); *A62C 3/08* (2013.01); *B64C 3/00* (2013.01)

(58) Field of Classification Search
CPC ................................. B64C 1/1453; A62C 3/08
See application file for complete search history.

(56) References Cited

U.S. PATENT DOCUMENTS

| 2,963,955 | A | 12/1960 | Artis et al. |
| 3,384,001 | A | 5/1968 | Mathis |
| 9,358,410 | B2 * | 6/2016 | Jullie ........................ A62C 3/08 |
| 10,293,195 | B2 * | 5/2019 | Takahashi .............. B64D 37/04 |
| 2018/0283217 | A1 * | 10/2018 | de Pau, Jr. ............. B64D 29/00 |

* cited by examiner

*Primary Examiner* — Brian M O'Hara
(74) *Attorney, Agent, or Firm* — Duft & Bornsen, PC

(57) ABSTRACT

A drain grommet with integrated fire shield. In one embodiment, the drain grommet includes a drain tube configured to extend through a drain, and to pass fluid through the drain via an opening into a hollow channel of the drain tube. The drain grommet further includes a fire shield integrally coupled with the drain tube via a standoff, wherein the standoff supports the fire shield at a vertical distance above the opening of the drain tube, and wherein the fire shield is larger than the opening of the drain tube in a horizontal plane.

20 Claims, 4 Drawing Sheets

DRAIN GROMMET WITH INTEGRATED FIRE SHIELD

FIELD

This disclosure relates to drain grommets, and more particularly, to drain grommets for an aircraft.

BACKGROUND

Various parts of an aircraft, such as the wings, are made of hollow cavities. The cavities may house cables that provide power, communication, and/or fuel for the aircraft. Additionally, a cavity may have one or more drainage holes in its floor to drain water or fuel that may have leaked in the cavity. These drainage holes enhance aircraft safety by preventing the accumulation of fluid and weight in the wings of the aircraft. However, a drainage hole may potentially expose critical cables in an aircraft cavity to an external hazard, such as fire flames from a nearby jet engine.

SUMMARY

Embodiments described herein provide a drain grommet with an integrated fire shield. The drain grommet is a unibody structure with a hollow body that fits into a drain. A fire shield is spaced above the hollow body via one or more standoffs. The configuration of the drain grommet enables fluid to exit an aircraft cavity through the hollow body while preventing entrance of an external hazard into the aircraft cavity.

One embodiment is an apparatus that includes a drain tube configured to extend through a drain, and to pass fluid through the drain via an opening into a hollow channel of the drain tube. The apparatus further includes a fire shield integrally coupled with the drain tube via a standoff, wherein the standoff supports the fire shield at a vertical distance above the opening of the drain tube, and wherein the fire shield is larger than the opening of the drain tube in a horizontal plane.

Another embodiment is a drain grommet for a drain in a cavity of an aircraft. The drain grommet includes a drain tube to fit in the drain, the drain tube including a hollow channel to convey fluid through the drain. The drain grommet also includes a flange at one end of the drain tube to support the drain grommet in the cavity, the flange including an opening into the hollow channel of the drain tube. The drain grommet further includes a standoff protruding perpendicularly from a top surface of the flange, and a fire shield coupled to the standoff at a distance above the opening of the flange.

Yet another embodiment is a wing cavity of an aircraft. The wing cavity includes one or more cables of the aircraft, a drainage hole in a floor of the wing cavity, and a drain grommet for the drainage hole. The drain grommet includes a tube to fit inside the drainage hole, and a flange around the tube to support the drain grommet on the floor of the wing cavity. The drain grommet also includes an opening in the flange and the tube to drain fluid from the wing cavity, a standoff protruding vertically from the flange, and a fire shield mounted on the standoff vertically above the flange. The fire shield is disposed between the opening of the drain grommet and the one or more cables of the aircraft.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
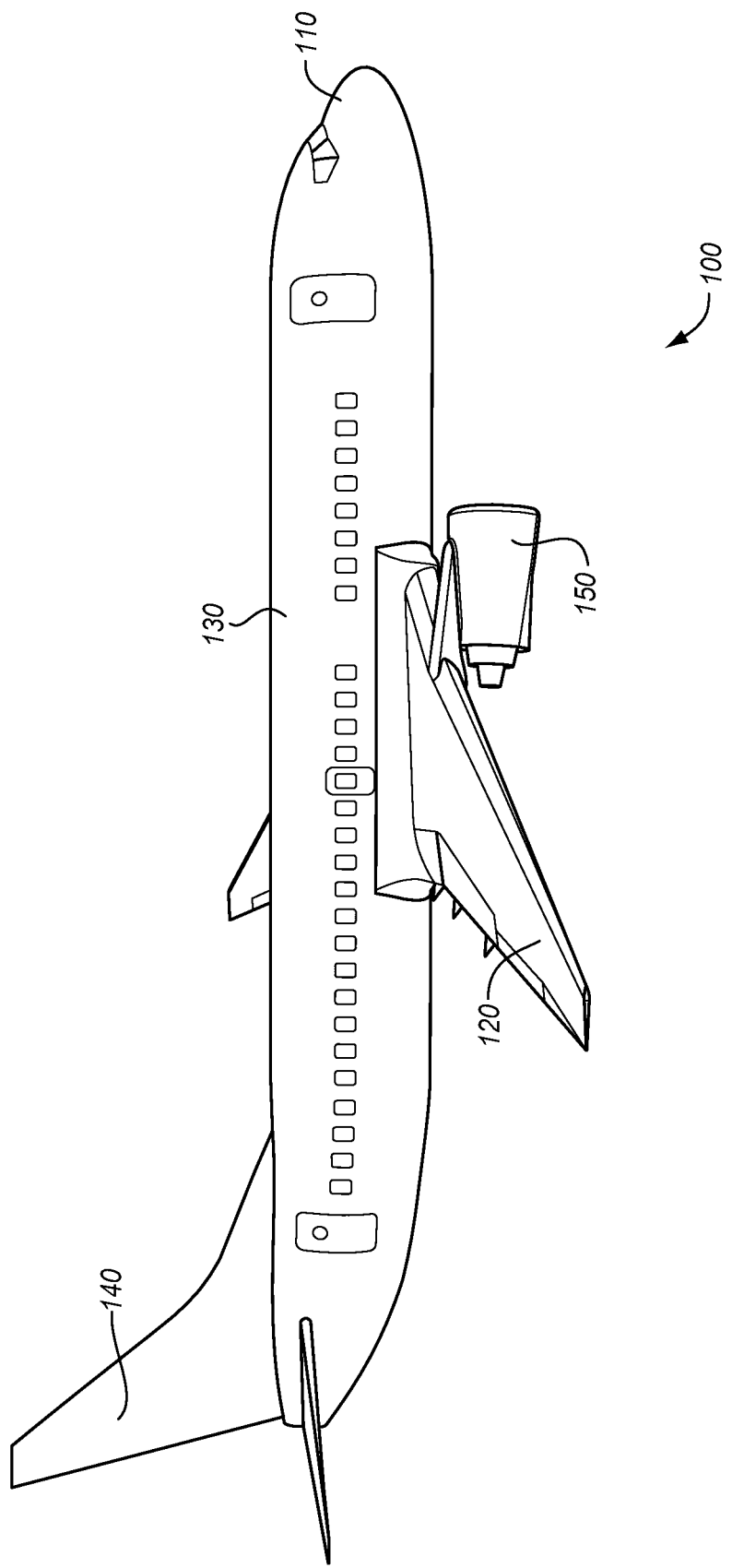
FIG. 1 illustrates an aircraft in an example embodiment.

FIG. 1 illustrates an aircraft 100 in an illustrative embodiment. The aircraft 100 includes a nose 110, a wing 120, a fuselage 130, a tail 140, and a jet engine 150. Further discussion of the aircraft 100 focus on the wing 120, however, embodiments described herein may apply to alternative locations of the aircraft 100 and other types of aircrafts and vehicles.

Figure 2A:
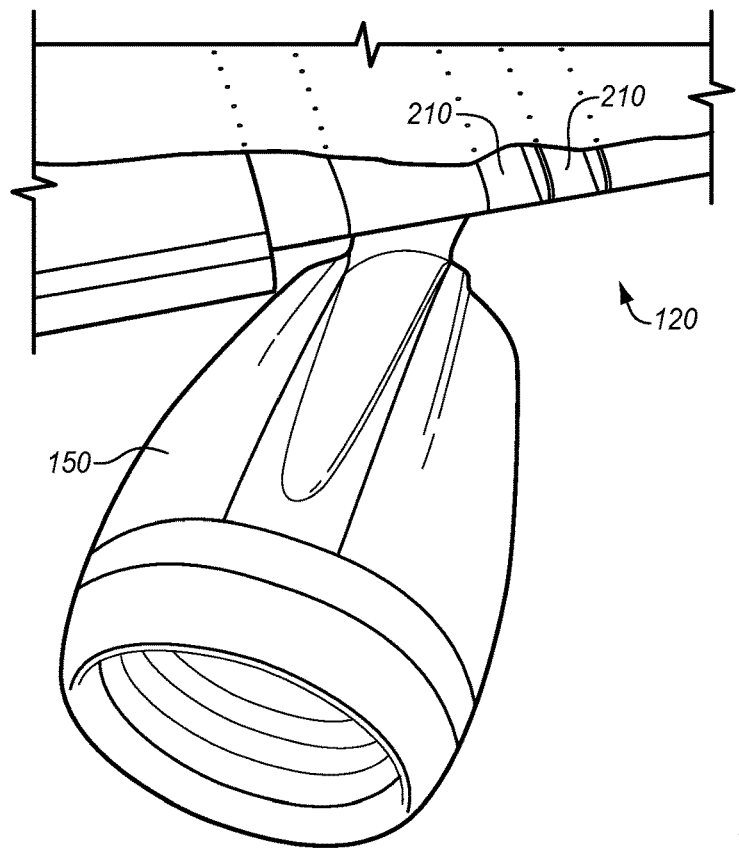
FIG. 2A is a perspective view of a wing and a jet engine in an illustrative embodiment.
Figure 2B:
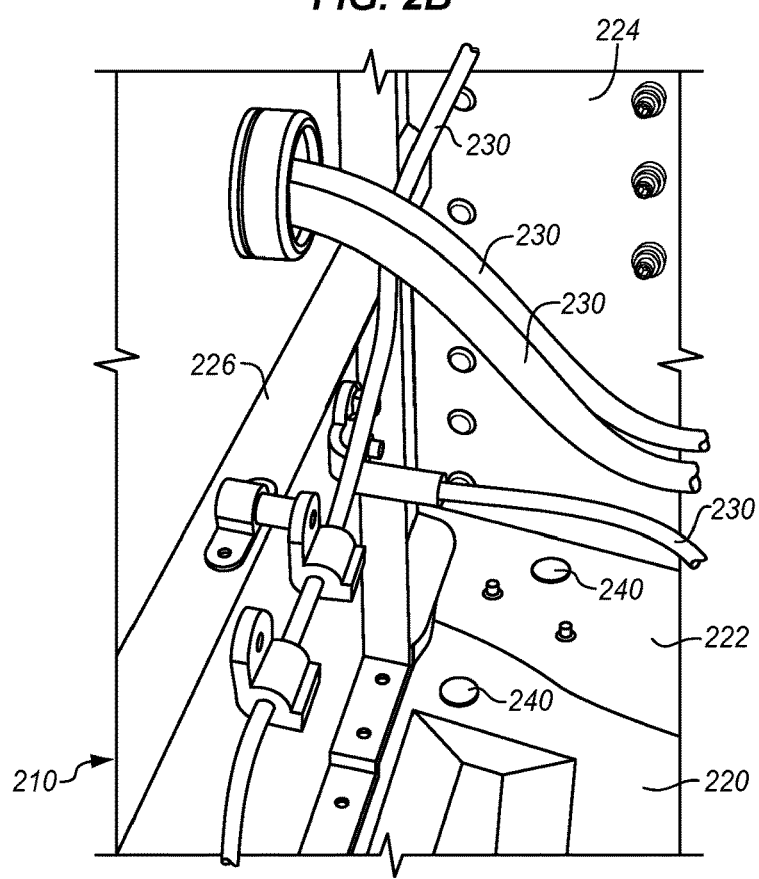
FIG. 2B illustrates a perspective view of a cavity in an illustrative embodiment.

FIG. 2A is a perspective view of the wing 120 and the jet engine 150 in an illustrative embodiment. The wing 120 generally includes a series of cavities 210. A cavity 210 may be proximate to the jet engine 150. FIG. 2B illustrates a perspective view of a cavity 210 in an illustrative embodiment. In this example, the cavity 210 is a hollow space that is enclosed by a fixed leading edge lower panel 220, a lower wing skin 222, a front spar 224, and a fixed leading edge seal rib 226. The cavity 210 may also include wires, tubes, and/or cables 230 which may provide power, communication, and/or fuel for the aircraft. Additionally, drainage holes 240 may be provided at low points in the floor of the cavity 210 (e.g., in the fixed leading edge lower panel 220 and/or the lower wing skin 222).

Figure 3:
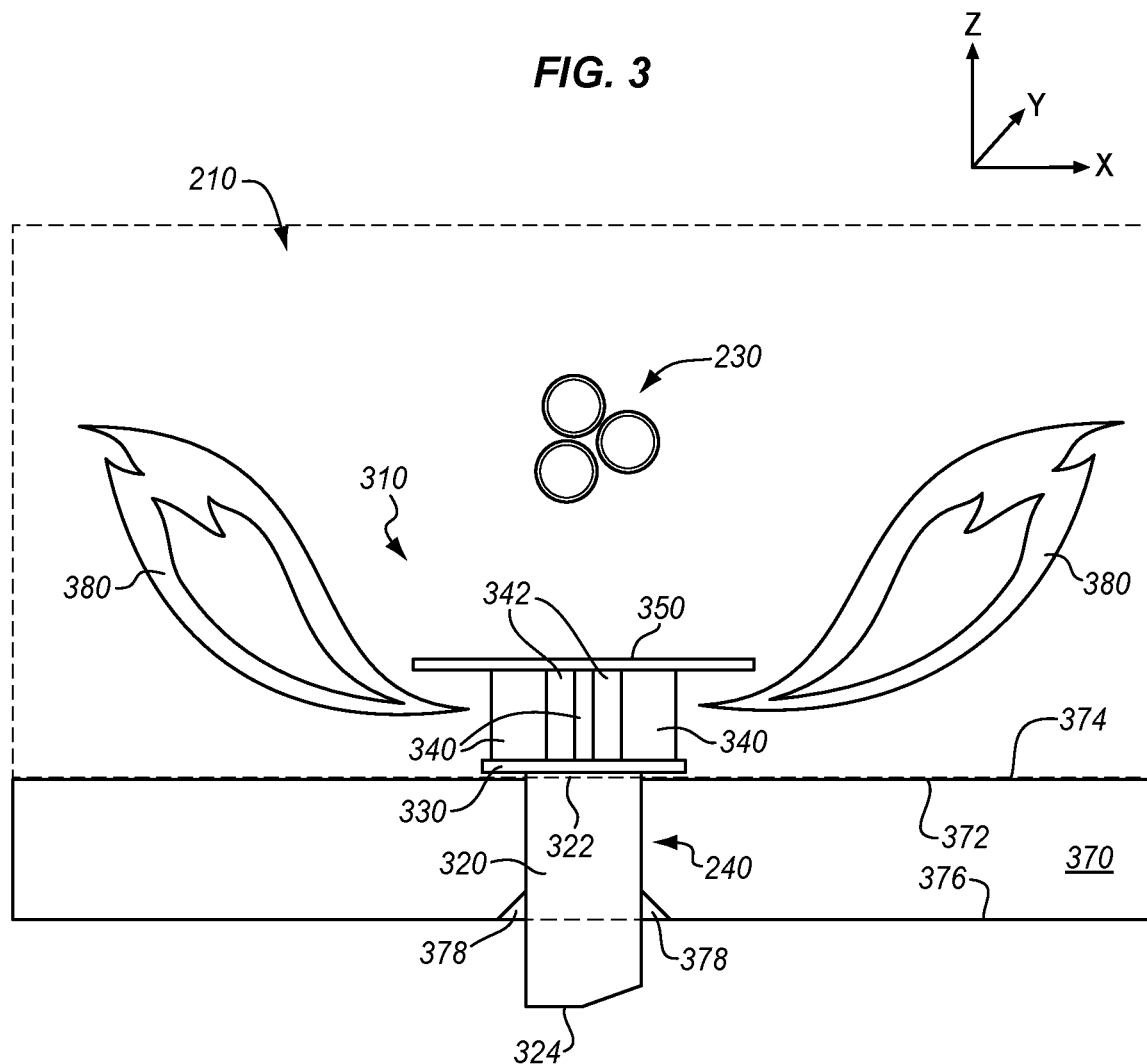
FIG. 3 is a cross sectional view of the cavity enhanced with a drain grommet to engage with the drainage hole in an illustrative embodiment.

FIG. 3 is a cross sectional view of the cavity 210 enhanced with a drain grommet 310 to engage with the drainage hole 240 in an illustrative embodiment. The drain grommet 310 includes a drain tube 320 to fit in the drainage hole 240, and further includes a flange 330 at a first end 322 of the drain tube 320 to support the drain grommet 310 against a substrate 370. The substrate 370 may include a panel of the wing 120 or other area of the aircraft 100. The substrate 370 has an inner wall 372 that defines a floor 374 of the cavity 210, and an outer wall 376 which faces the environment outside the aircraft 100. The drainage hole 240 extends through the substrate 370 from the inner wall 372 to the outer wall 376.

The drain tube 320 generally has elongated (e.g., cylindrical) body with a hollow channel (not shown) to convey fluid through the drainage hole 240. The drain tube 320 may extend through the substrate 370 from a first end 322 at or near the inside of the cavity 210 to a second end 324 that protrudes outside the substrate 370 and outside the aircraft 100. Alternatively, the second end 324 of the drain tube 320 may be substantially flush with the outer wall 376 of the substrate 370. The flange 330 provides a ridge around the first end 322 of the drain tube 320 to support the drain grommet 310 on the floor 374 of the cavity 210. In general, the flange 330 is larger than the drainage hole 240 in a horizontal plane (e.g., X-Y plane). As such, the flange 330 may be flush with the floor 374 of the cavity 210 and surround the perimeter of the drainage hole 240 at the floor 374. Additionally, the flange 330 includes an opening (not shown) for fluid to pass into the hollow channel of the drain tube 320 and drain from the cavity 210 to the environment outside the aircraft 100.

In general, the cables 230 extending through the cavity 210 may provide important functionality for the aircraft 100 such as flight control communications. If there is a direct path from the inside of the cavity 210 to the outside of the substrate 370, the cables 230 may potentially be exposed to damage by an external hazard, such as fire from a nearby jet engine 150.

Therefore, the drain grommet 310 is enhanced to include a fire shield 350 that is integrally coupled with the flange 330 and/or drain tube 320 via one or more standoffs 340. In general, the fire shield 350 covers the flange 330 and/or drain tube 320 horizontally (e.g., in the X-Y plane) to prevent direct impingement of an external hazard through the drain tube 320 and into the cavity 210 of the aircraft 100. For instance, as shown in FIG. 3 with the drain grommet 310 installed in the drainage hole 240, the fire shield 350 may be disposed between the drain tube 320 and the cables 230 to reroute flames 380 entering the cavity 210 away from the cables 230.

The standoffs 340 may be vertical columns protruding perpendicularly from the flange 330 in a vertical direction (e.g., Z direction) to support the fire shield 350 at a fixed vertical distance above the flange 330. The standoffs 340 have spaces 342 between them to enable fluid to reach the drain tube 320 and drain from the cavity 210. Therefore, the configuration of the drain grommet 310 provides a technical benefit of protecting components inside the cavity 210 from external hazards while still enabling fluid to drain from the cavity 210 of the aircraft 100.

The drain tube 320, the flange 330, the standoffs 340, and the fire shield 350 may be integrally formed together as a unitary structure. The drain grommet 310 may be formed using conventional machining, additive manufacturing, or other suitable processes. The material of the drain grommet 310 may include titanium, aluminum, stainless steel, copper, brass, ceramic, plastic, composite, or other suitable flame resistant/proof materials. Moreover, the drain grommet 310 may be secured in place to the substrate 370 via optional mechanical retainers 378 and/or a flame-resistant adhesive.

Figure 4A:
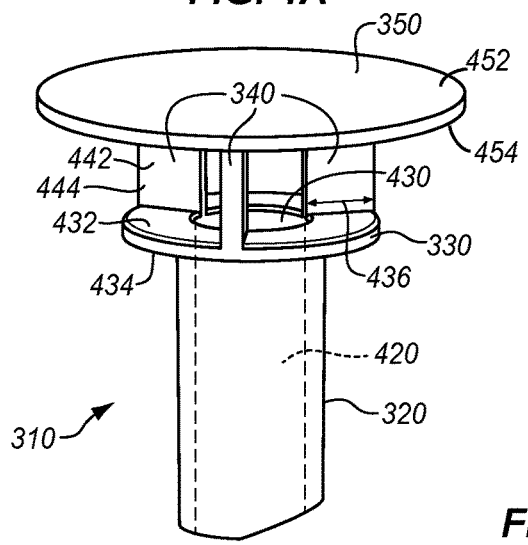
FIG. 4A is a perspective view of the drain grommet in an illustrative embodiment.

FIG. 4A is a perspective view of the drain grommet 310 in an illustrative embodiment. As shown in FIG. 4A, the drain tube 320 includes a hollow channel 420 to convey fluid, and the flange 330 includes an opening 430 into the hollow channel 420 to allow fluid to exit the cavity 210. The flange 330 may include a disc-shaped body having a top surface 432 and a bottom surface 434 that are substantially flat with the opening 430 through their centers. The bottom surface 434 supports the flange 330 against the floor 374 of the substrate 370, therefore supporting the drain grommet 310 in position in the drainage hole 240 and the cavity 210.

In this example, the standoff 340 includes three vertical columns to surround (or at least partially surround) the opening 430. The standoffs 340 protrude perpendicularly from the top surface 432 of the flange 330 and support the fire shield 350 at a vertical distance above the opening 430. However, alternative orientations of the standoffs 340 are possible. The fire shield 350 may include a disc-shaped body having a top surface 452 and a bottom surface 454 that are substantially flat. The disc-shaped body of the fire shield 350 may have a radius that is larger than a radius of the hollow channel 420 and/or the opening 430. The bottom surface 454 of the fire shield 350 couples with the standoffs 340. To increase drainage into the opening 430 (e.g., to increase gap of spaces 342), the standoffs 340 may be formed of a vertical column having a broad side 442 and a narrow side 444. The broad side 442 may extend along a band thickness 436 of the flange 330. The band thickness 436 may be defined by a distance between an inner perimeter and outer perimeter of the flange 330, or a radial distance from the outer circumference of the opening 430 to an outer circumference of the flange 330. The narrow side 444 may be perpendicular to and smaller than the broad side 442.

Figure 4B:
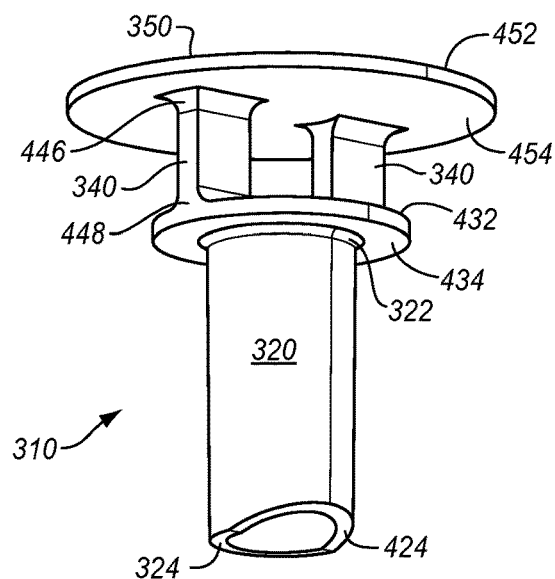
FIG. 4B is another perspective view of the drain grommet in another illustrative embodiment.

FIG. 4B is another perspective view of the drain grommet 310 in another illustrative embodiment. In this example, the standoffs 340 includes two vertical columns having a top end 446 that couples to the bottom surface 454 of the fire shield 350, and a base end 448 that couples to the top surface 432 of the flange 330 (e.g., proximate to an outer perimeter of the opening 430). The standoffs 340 may be disposed on either side of the opening 430, and the fire shield 350 may be centered on the standoffs 340. Moreover, the fire shield 350 may align vertically and/or share a common center with the flange 330, the opening 430, and/or the hollow channel 420. The first end 322 of the drain tube 320 couples with the bottom surface 434 of the flange 330. Additionally, in this example, the second end 324 of the drain tube 320 includes a chamfer end 424 which may be exposed in the environment outside the aircraft 100 to help suction fluid out of the drain tube 320.

Figure 4C:
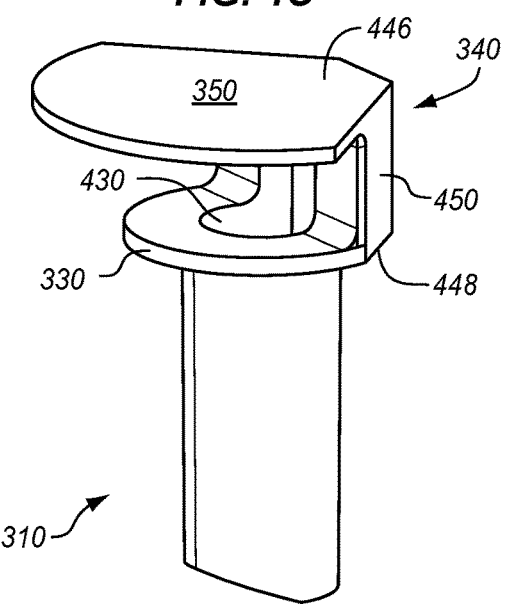
FIG. 4C is a perspective view of the drain grommet in a further illustrative embodiment.

FIG. 4C is a perspective view of the drain grommet 310 in a further illustrative embodiment. In this example, the standoff 340 includes a wall 450 that partially surrounds the opening 430. In one embodiment, the standoff 340 surrounds the opening 430 for at least a quarter of the outer perimeter of the opening 430. The standoff 340 may be disposed on one side of the flange 330 such that half or more of the opening 430 is directly exposed to fluid drain toward the drainage hole 240. Furthermore, the fire shield 350 in this example includes a wedge-shaped body that protrudes horizontally from the top end 446 of the standoff 340 to cover the opening 430 of the drain tube 320 in the horizontal plane. The wall 450 and/or the fire shield 350 having the wedge-shaped body may be disposed in the cavity 210 between the cables 230 and the opening 430. That is, the drain grommet 310 having the standoff 340 with the wall 450 and/or the fire shield 350 having the wedge-shaped body may be oriented in the cavity 210 to further limit exposure of a particular side or area of the cavity 210 to external hazards. Numerous variations and configurations of the drain grommet 310 are possible to achieve a desired balance of drainage capacity and external hazard protection in the cavity 210.

Although embodiments described herein refer to the cavity 210 of the wing 120 of the aircraft 100, it will be appreciated that features of the drain grommet 310 may be similarly applied to alternative areas of the aircraft 100 as well as alternative aircrafts. Furthermore, it will be appreciated that various alternative shapes and configurations of components of the drain grommet 310 other than that explicitly shown and described are possible. For instance, the standoffs 340 may couple directly to the drain tube 320 without a flange 330, and the opening 430 may be considered as part of the hollow channel 430 of the drain tube 320. Although specific embodiments were described herein, the scope is not limited to those specific embodiments. Rather, the scope is defined by the following claims and any equivalents thereof.

What is claimed is:

1. An apparatus comprising:
a drain tube configured to extend through a drain, and to pass fluid through the drain via an opening into a hollow channel of the drain tube; and
a fire shield integrally coupled with the drain tube via a standoff, wherein the standoff supports the fire shield at a vertical distance above the opening of the drain tube, and wherein the fire shield is larger than the opening of the drain tube in a horizontal plane.

2. The apparatus of claim 1 further comprising:
a plurality of standoffs coupling the drain tube and the fire shield, the standoffs having base ends coupled to the drain tube proximate to an outer perimeter of the opening, and top ends coupled to a bottom surface of the fire shield.

3. The apparatus of claim 2 wherein:
the standoffs are spaced from one another around the outer perimeter of the opening to enable the fluid to pass between the standoffs into the opening and through the hollow channel of the drain tube.

4. The apparatus of claim 3 wherein:
the fire shield includes a disc-shaped body having a first radius, the opening of the drain tube is circular having a second radius, and the first radius of the fire shield is larger than the second radius of the opening of the drain tube.

5. The apparatus of claim 1 wherein:
the standoff includes a base end coupled to the drain tube to partially surround an outer perimeter of the opening, a wall protruding vertically from the base end, and a top end coupled to a bottom surface of the fire shield.

6. The apparatus of claim 5 wherein:
the base end and the wall of the standoff surround the opening for at least a quarter of the outer perimeter of the opening.

7. The apparatus of claim 5 wherein:
the fire shield includes a wedge-shaped body that protrudes horizontally from the top end of the standoff to cover the opening of the drain tube in the horizontal plane.

8. The apparatus of claim 1 wherein:
the drain tube includes a flange around an outer perimeter of the opening.

9. A drain grommet for a drain in a cavity of an aircraft, the drain grommet comprising:

a drain tube to fit in the drain, the drain tube including a hollow channel to convey fluid through the drain;
a flange at one end of the drain tube to support the drain grommet in the cavity, the flange including an opening into the hollow channel of the drain tube;
a standoff protruding perpendicularly from a top surface of the flange; and
a fire shield coupled to the standoff at a distance above the opening of the flange.

10. The drain grommet of claim 9 wherein:
the fire shield covers the opening of the flange horizontally to prevent direct impingement of an external hazard through the drain tube and into the cavity of the aircraft.

11. The drain grommet of claim 9 wherein:
the fire shield is aligned vertically above the opening of the flange at the distance to allow fluid to pass into the opening and through the hollow channel to exit the cavity.

12. The drain grommet of claim 9 wherein:
the drain tube extends through the cavity from a first end connected to the flange to a second end that protrudes from the cavity outside the aircraft.

13. The drain grommet of claim 9 further comprising:
the flange surrounds the drain and is flush with a floor of the cavity.

14. A wing cavity of an aircraft, the wing cavity comprising:
one or more cables of the aircraft;
a drainage hole in a floor of the wing cavity;
a drain grommet for the drainage hole, the drain grommet including:
a tube to fit inside the drainage hole;
a flange around the tube to support the drain grommet on the floor of the wing cavity;
an opening in the flange and the tube to drain fluid from the wing cavity;
a standoff protruding vertically from the flange;
a fire shield mounted on the standoff vertically above the flange;
wherein the fire shield is disposed between the opening of the drain grommet and the one or more cables of the aircraft.

15. The wing cavity of claim 14 wherein:
wherein the standoff includes a plurality of vertical columns situated on the flange and around the opening, the vertical columns having space therebetween to enable fluid to reach the opening and drain from the wing cavity.

16. The wing cavity of claim 14 wherein:
the standoff includes a wall that partially surrounds the opening, the wall being disposed between the opening and the one or more cables.

17. The wing cavity of claim 14 wherein:
the fire shield extends horizontally beyond the opening to protect the one or more cables from a flame entering through the tube.

18. The wing cavity of claim 14 wherein:
the tube extends through the wing cavity from a first end connected to the flange to a second end that protrudes from the wing cavity outside the aircraft.

19. The wing cavity of claim 18 wherein:
the second end of the tube includes a chamfer end to suction fluid from the wing cavity.

20. The wing cavity of claim 14 wherein:
the flange is flush with the floor of the wing cavity.

* * * * *